United States Patent [19]

Ferguson et al.

[11] 4,407,832

[45] Oct. 4, 1983

[54] PROCESSING OF MUSHROOMS WITH REDUCED WEIGHT LOSS

[75] Inventors: Andrew M. Ferguson, Alexandria, Va.; Howard M. Malick, West Chester, Pa.

[73] Assignee: Mushroom Associates, Kennett Square, Pa.

[21] Appl. No.: 308,681

[22] Filed: Oct. 5, 1981

Related U.S. Application Data

[63] Continuation-in-part of Ser. No. 266,222, May 11, 1981, abandoned, and a continuation-in-part of Ser. No. 46,078, Jun. 6, 1979, abandoned.

[51] Int. Cl.³ .............................................. A23L 1/212
[52] U.S. Cl. .................................... 426/281; 426/615; 426/325; 426/327; 426/321
[58] Field of Search .............. 426/281, 615, 325, 327, 426/321

[56] References Cited

U.S. PATENT DOCUMENTS

| | | | |
|---|---|---|---|
| 3,023,104 | 2/1962 | Battista et al. | 426/573 X |
| 3,147,122 | 9/1964 | Williams | 426/281 |
| 3,231,395 | 1/1966 | Duggan et al. | 426/615 X |
| 3,623,893 | 11/1971 | Mange | 426/281 |
| 3,843,810 | 10/1974 | Fehmerling | 426/615 |
| 3,857,979 | 12/1974 | Beauvais et al. | 426/615 |
| 4,143,167 | 3/1979 | Blanchaud | 426/615 X |

OTHER PUBLICATIONS

Avicel, RC-591 in Foods, Technical Bulletin RC-22, May 1971, FMC Corp: Marcus Hook, Pa., p. 1.

*Primary Examiner*—Joseph M. Golian
*Attorney, Agent, or Firm*—Henderson & Sturm

[57] ABSTRACT

Freshly picked washed mushrooms are subject to a modified atmosphere and infused with a suspension containing a particulate microscopic heat stable material. Upon blanching in boiling water the weight loss experienced is reduced from a normal 24% to 33% loss to between a 2% loss and a 5% or more weight gain.

14 Claims, 6 Drawing Figures

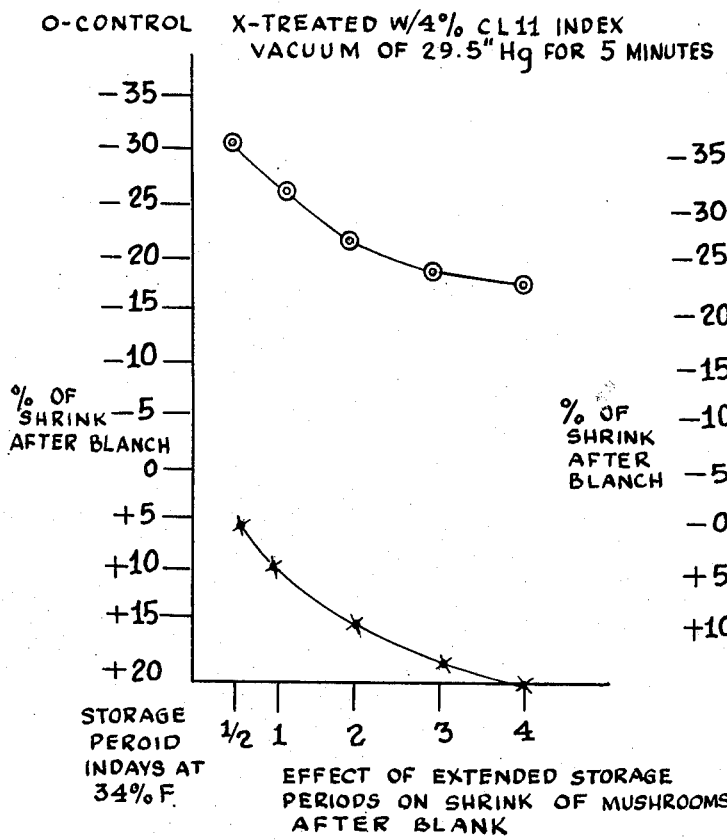
FIG. 4. EFFECT OF EXTENDED STORAGE PERIODS ON SHRINK OF MUSHROOMS AFTER BLANK
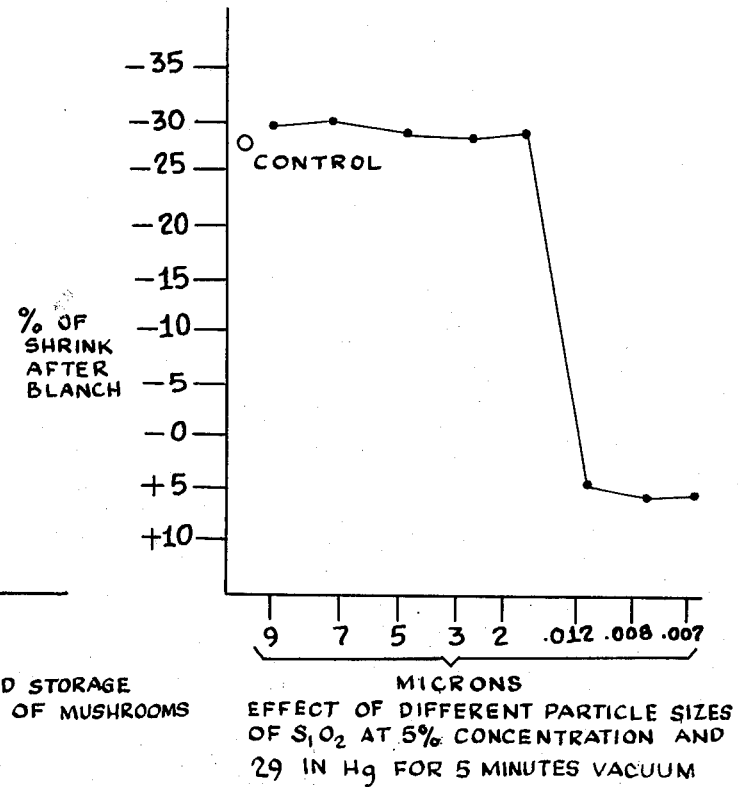
FIG. 5. EFFECT OF DIFFERENT PARTICLE SIZES OF $SiO_2$ AT 5% CONCENTRATION AND 29 IN Hg FOR 5 MINUTES VACUUM
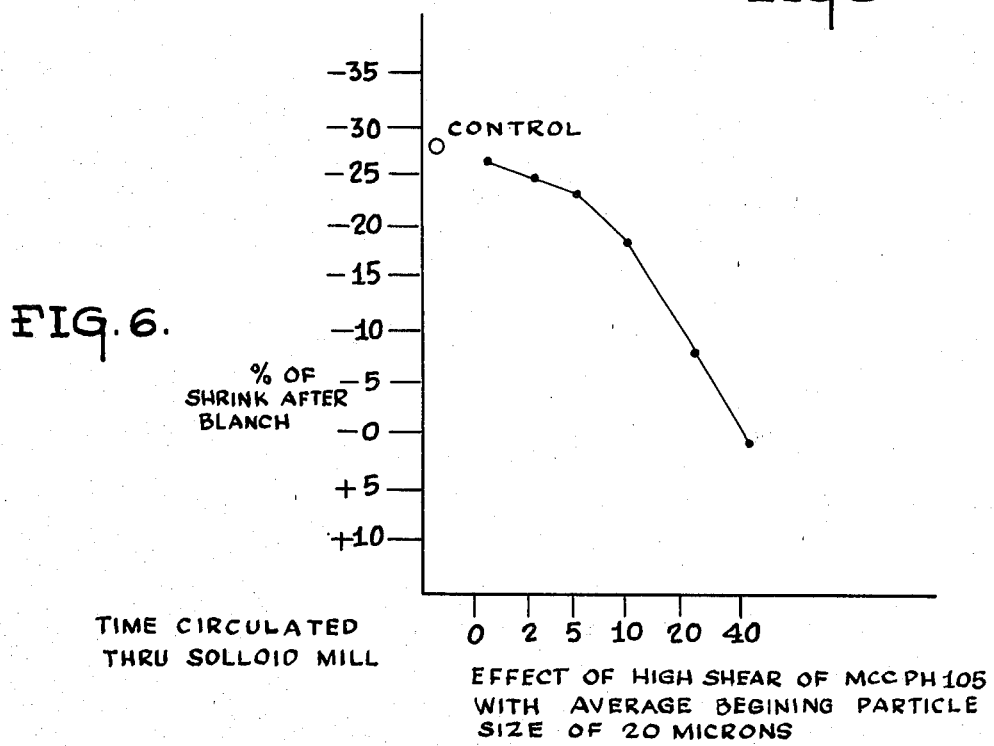
FIG. 6. EFFECT OF HIGH SHEAR OF MCC PH 105 WITH AVERAGE BEGINING PARTICLE SIZE OF 20 MICRONS 4,407,832

PROCESSING OF MUSHROOMS WITH REDUCED WEIGHT LOSS

BACKGROUND OF THE INVENTION

This invention is a continuation-in-part-application of U.S. patent application Ser. No. 46,078, filed June 6, 1979, now abandoned and copending U.S. patent application Ser. No. 266,222, filed May 11, 1981 now abandoned.

Mushrooms commonly lose approximately 25% to 30% or more of their fresh weight when subject to the blanching process prior to canning. The blanching process is designed to inactivate certain enzymes and partially sterilize the mushrooms and involves either steam or boiling water cooking for approximately five (5) minutes to bring the internal temperature to 180° F. or above.

Sterilization after canning normally results in an additional 10% to 15% weight loss. Sterilization is normally accomplished in a pressure vessel and involves bringing the temperature at the middle of the sealed can to 250° F. and holding this temperature a sufficient time to destroy thermophylic organisms which may be present and complete the sterilization.

The combination of these two processes result in an expected weight loss during canning of mushrooms of 35% to over 40%.

The extreme weight loss sets mushrooms apart from other vegetables as does the fact that they are a macro fungi rather than a chlorophyl producing plant.

The weight loss that is experienced in the canning process makes the canned product more expensive than fresh mushrooms. The canned mushroom, upon further cooking such as sauteing, still experiences a further weight loss.

Several processes have been proposed for reducing the weight loss experienced during canning mushrooms. U.S. Pat. No. 3,843,810, to Fehmerling proposes applying a vacuum down to lower than 13 mm of mercury in a slow, controlled descent followed by at least one hour at the minimum pressure then a slow increase in pressure to ambient, while soaking the mushrooms in a water solution. The process takes a minimum of two hours in the vacuum and preferably three hours. The average yield after blanching given by Fehmerling with a three hour process is given as 84%. Additionally, Fehmerling shows a series of comparisons between his process and other vacuum processes.

The best previous process known to the present inventors is shown in U.S. Pat. No. 4,143,167, to Blanchaud, et al. This process also uses a vacuum down to approximately 50 mm to 60 mm of mercury in a solution wherein is disolved 1% to 6% dried egg albumin or equivelent. The albumin is then coagulated during the blanching process. This treatment does succeed in reducing the weight loss somewhat, however, the resulting product has objectionable coagulated albumin hanging from it and the texture is noticably tough and rubbery.

Mushrooms, after harvest, are normally commercially stored at approximately 32° F. to retard further respiration which would result in opening of the veil which makes them less desirable and to reduce the weight loss during storage since mushrooms continue to respire after harvest.

It is known to commercial canners and shown in the experiments of McArdle, et al., in 1962, that there is a relationship between the length of post harvest storage and the amount of weight loss experienced during canning. The small reduction of the weight loss is partially offset by the weight loss in storage due to respiration of the mushroom along with deterioration of color and blemishing and the increased number of "opens" or lower grade mushrooms from extended storage. Even this slight reduction in weight loss prompts most mushrooms canneries to store fresh mushrooms at about 32+ for two to three days prior to canning.

SUMMARY OF THE INVENTION

The present invention provides a rapid, economical procedure for substantially reducing the weight loss presently experienced in canning or cooking mushrooms. This is brought about by use of a rapid vacuum and/or pressure assisted impregnation into the mushroom of a microscopic sized particulate hydrophillic material in suspension in a water based vehicle. This rapid infusion raises the weight of the mushroom by up to 50% or more of their fresh weight as in other known vacuum hydrating processes. However, subsequent blanching of the mushrooms after treatment results in a loss back to close to their fresh weight rather than a loss close to that of untreated mushrooms as in the previous process. Canning and retorting of these treated, blanched mushrooms cause an additional weight loss but the total weight loss in canning is reduced to approximately 10% to 15% of the original fresh weight as opposed to 33% to 40% weight loss which is experienced by conventional processing methods.

The resulting mushrooms, in addition to the reduction in weight loss, have a texture both before and after subsequent cooking which is markedly superior to presently available canned mushrooms and is often judged better than fresh mushrooms that have been similarly cooked by common methods such as sauteing or in a tomato sauce.

The method and materials are fully explained in the following description of the preferred embodiments and drawing figures.

BRIEF DESCRIPTION OF THE DRAWINGS

FIG. 4 illustrates the effect of extended cold storage of mushrooms on the process results.

FIGS. 5 and 6 illustrate the effects of particle size on the process using a variety of materials having other physical properties in common.

DETAILED DESCRIPTION OF THE PREFERRED EMBODIMENT

Figure 1:
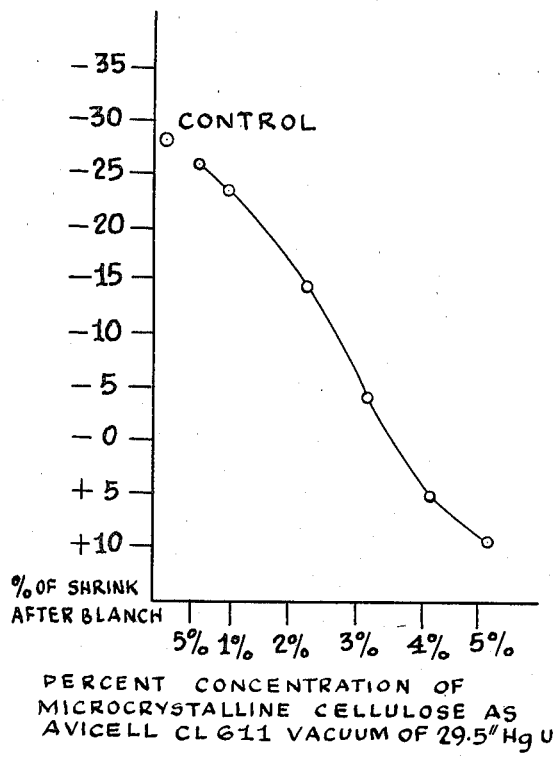
FIGS. 1 thru 3, illustrate the effects of variations in methods and material concentrations on a preferred embodiment of the process.

The improved processing method comprises a vacuum or pressure assisted infusion of a microscopic particulate hydrophilic material into the mushroom. A variety of materials are suitable for this process and a number of them are discussed in the balance of the disclosure. A particular material that combines all of the properties required is microcrystalline cellulose as described in U.S. Pat. No. 3,023,104. The particular type of microcrystalline cellulose that has been found to be most readily usable for the process is marketed by FMC Corporation under the trade name of AVICEL type CL-611, which combines microcrystalline cellulose in an average particle size of about 0.2 microns with sodium carboxymethyl cellulose gum to aid in ready dispersion in liquid. The manufacturer's tests indicate that approximately 60% to 70% of the CL-611 material is 0.2 microns in size with the balance being of larger sizes ranging up to approximately 20 microns.

Microcrystalline cellulose is a minute particulate aggregate widely used in the food industry as a bulking agent, in dietary foods and as a thickening and stabilizing agent in sauces, etc. This material is used in the majority of the tests which illustrate the parameters of the invention and a number of other materials are included in tests illustrating the importance of the particular combination of physical properties in any material in order to be successfully applied to the process.

The following examples are presented to illustrate the particulars of the present invention and alternative methods for the accomplishment of the desired ends.

During the course of the tests, mushrooms from various growers were randomly selected. The mushrooms used for the tests were less than 24 hours post harvest, unless otherwise noted, and had been stored in commercial facilities at a temperature of approximately 32° F. and high relative humidity. Weight changes during the tests are expressed as percentage of the beginning weights of the samples to provide ready comparison. The percentages in all cases are averages obtained from multiple repetitions of the tests.

All tests were performed in the following manner unless otherwise noted.

Samples were drawn from standard 10 pound boxes as delivered to the processor by the grower. Weights were recorded using a laboratory scale. Samples were all washed by tumbling in fresh water for three minutes, closely approximating the initial processing in commercial operations.

Samples were then drained for three minutes on a slanted screen and weighted again.

The selected treatment method was performed and the sample was again drained and weighed.

The samples were plunged into boiling water for five minutes then cooled in water for three minutes to approximately 80° F. internal temperature. The sample was again drained and weighed.

Sample No. 1, is a control and no processing was used other than washing and blanching.

Sample No. 2, was submerged in water and subjected to a vacuum of approximately 29.5 inches of mercury for five minutes. The vacuum was released for one minute, reapplied for five minutes, and released again.

Sample No. 3, was treated the same as No. 2, except a 2% by weight solution of Carrageenan (an algin derivative non heat stable gel) in water was used.

Sample No. 4, was submerged in a 4% by weight suspension of AVICEL type CL-611 and subjected to an overpressure of 10 psi for 30 seconds. The pressure was rapidly released at a rate of greater than 3 psi per second, left off for 10 seconds and applied a second time for 30 seconds, rapidly released, left off for 10 seconds, reapplied for 30 seconds and again released.

Sample No. 5, was treated the same as No. 4, except a pressure of 15 psi was used.

Sample No. 6, was treated the same as No. 4, except a pressure of 20 psi was used.

Sample No. 7, was treated the same as No. 4, except a pressure of 25 psi was used.

Sample No. 8, was treated the same as No. 4, except a pressure of 30 psi was used.

Sample No. 9, was treated the same as No. 4, except a pressure of 80 psi was used.

Sample No. 10, was submerged in a 4% by weight suspension of AVICEL type CL-611 in water, subjected to a vacuum of approximately 29.5 inches of mercury for five minutes. The vacuum was released and the mushrooms were allowed to stand in the suspension for one minute.

Sample No. 11, was submerged in a 4% by weight suspension of AVICEL type CL-611 in water and subjected to a vacuum of approximately 29.5 inches of mercury for five minutes. The vacuum was released for one minute and reapplied for five minutes. The vacuum was again released and the mushrooms allowed to stand in the suspension for one minute.

The results of the various comparative tests are summarized in Table 1.

TABLE 1*

| SAMPLE | START | AFTER WASH | AFTER TREATMENT | AFTER BLANCH & COOL | |
|---|---|---|---|---|---|
| 1 | 100 | 113 | — | 74 | Control |
| 2 | 100 | 112 | 155 | 75 | Water & Vacuum |
| 3 | 100 | 112 | 156 | 77 | Carrageman & Vacuum |
| 4 | 100 | 112 | 145 | 86 | 3 × 10 psi |
| 5 | 100 | 113 | 148 | 90 | 3 × 15 psi |
| 6 | 100 | 112 | 147 | 91 | 3 × 20 psi |
| 7 | 100 | 113 | 148 | 90 | 3 × 25 psi |
| 8 | 100 | 112 | 146 | 88 | 3 × 30 psi |
| 9 | 100 | 111 | 145 | 89 | 3 × 80 psi |
| 10 | 100 | 112 | 152 | 100 | Vacuum 1 times |
| 11 | 100 | 113 | 160 | 105 | Vacuum 2 times |

*(weights expressed as percentage of fresh weight).

A vacuum of approximately 29.5 inches of mercury was chosen since it is fairly easily obtainable with laboratory equipment. The use of two 5 minute time periods in the vacuum was chosen since it can reasonably be assured that complete evacuation to the selected level will have been reliably repeated by this procedure. As illustrated in further testing, these levels and durations of vacuum are widely variable while still obtaining the desired results.

It is evident from the tests performed that infusing a particulate heat stable material in a suspension such as microcrystalline cellulose codried with a protective hydrocolloid as found in AVICEL type CL-611 produced a remarkable reduction in the weight loss experienced.

The infusion of water or a non heat stable gel such as carregeenan has little effect on the shrinkage experienced when using a similar process.

It is seen that producing the infusion by means of drawing and releasing a vacuum is a superior method to utilizing pressure to produce the infusion. It is particularly interesting to note, however, that a moderate pressure of from 15 psi to 30 psi over the ambient followed by rapid release of the pressure and preferably repeating the pressure and release two or three times does produce an infusion into the mushroom to a degree sufficient to sizeably reduce the shrinkage during blanching. The use of pressure to produce an infusion in mushrooms is a completely new approach in mushroom processing. Mushrooms are a porous, resilient plant product that are considered to be very delicate and are particularly susceptible to bruising. For this reason, transport of mushrooms during processing is generally done by water flume rather than by conveyors or other means to reduce bruising and the resulting lowering of the quality of the product. The use of overpressure and rapid release to produce the infusion in the mushrooms resulted in no detectable bruising or damage to the mushrooms whatsoever as could be determined from careful examination. The rapid accomplishment of an infusion by means of pressure rather than vacuum is an unexpected and valuable discovery.

In many cases a moderate overpressure of between 15 psi and 30 psi is much easier to accomplish than drawing a considerable vacuum in commercial size applications. It has also been discovered that overpressure above approximately 30 psi to 35 psi has little or no added benefit as illustrated by sample No. 9, wherein 80 psi overpressure was used with no significant difference in the weight of the mushrooms after treatment or after blanch when compared to the results obtained with pressures of 10 psi to 30 psi.

Using a single pressure application and rapid release the shrink reduction after blanch was approximately 80% of the reduction experienced after three pressure and release cycles. Two pressure and rapid release cycles accomplished over 90% of the results using three cycles. More than three pressure and rapid release cycles resulted in no significant repeatable improvement over that obtained in three cycles.

After the first pressure application and rapid release profuse bubbling could be observed from air expelled from the mushrooms. After the second pressure and release cycle moderate bubbling was observed and after the third pressure and release cycle sparse bubbling was seen. Only a minute amount of bubbling was observed after additional pressure and release cycles.

The rapid release of the applied pressure apparently causes the mushroom and the air compressed within it to rebound in an elastic manner resulting in a portion of the air being expelled and replaced by the liquid suspension. After three of these pulse-like cycles, virtually all of the air that can be expelled by this method has apparently escaped and been replaced by the surrounding suspension.

It has been observed during these tests that after a single vacuum application and release approximately 20% of the mushrooms remain floating. After drawing and releasing the vacuum the second time virtually 100% of the mushrooms sank to the bottom of the liquid indicating virtually complete saturation.

Due to the fact that mushrooms commonly float in water by reason of large amounts of air incorporated into the intermycellular spaces it is probable that these mushrooms still floating after the first vacuum application were slightly above the level of the liquid when the vacuum was broken and drew some air back into the spaces rather than the liquid. The use of a second vacuum application eleminated this potential source of variations in the results of the tests.

Tests were also made combining the use of single and multiple low overpressure applications either before or after a single vacuum application. The results of these tests were similar to those given for samples 5 thru 10 with the majority giving results close to those of sample 10.

Mushrooms treated by the process of example No. 11, were further processed by actual canning and sterilization in commercial equipment along with control samples from the same lot of mushrooms which were conventionally processed. Beginning weights, weights after blanching, and weights of blanched mushrooms placed in each can prior to sterilization were recorded. After the cans were sealed, commerical process sterilization equipment was used to bring the temperature at the center of the cans to 250° F. and hold this temperature a sufficient time to fully sterilize the contents.

Sample cans of the treated and control mushrooms were opened, drained and weighed after one day storage and one week storage. The conventionally processed mushrooms experienced a total shrinkage of between 32% and 37% of their fresh weight. The mushrooms processed according to the procedure in example No. 11, experienced a total shrinkage of between 11% and 14% of their fresh weight.

Blind taste and appearance comparative tests were conducted using subjects involved in the mushroom industry, either as growers, or in processing, or marketing. Samples of canned mushrooms processed conventionally and by the process of example No. 11, were served as they came from the can, cooked by sauteing, and cooked in a commercially available tomato sauce for spaghetti.

The mushrooms prepared by the process of example No. 11, were chosen unanimously for better color and appearance. There was no discernible difference expressed as regards taste. Surprisingly, the mushrooms prepared by the process of example No. 11, were unanimously remarked upon as being superior in texture, retaining a fresh uniform tender texture throughout while the conventionally processed mushrooms had a characteristic toughness of skin after being sauted and especially after cooking in the tomato sauce.

Additional tests were conducted with mushrooms processed according to the procedures of example No. 11, and frozen.

Frozen mushrooms are used commercially by restaurants, and in ready to cook frozen foods such as pizzas.

Fresh frozen mushrooms, when cooked, lose a considerable amount of water weight. This is particularly objectional in items such as frozen pizzas wherein the mushrooms often form a puddle of almost boiling water with noticeable shrinking. Weight loss from cooking fresh frozen mushrooms average from 40% to 50% of the fresh weight. Weight loss from cooking mushrooms treated and blanched according to the process of example No. 11, and then frozen average between 14% and 22% of their beginning fresh weight. This remarkable reduction in weight loss was accompanied by an equal reduction in the puddling and visably noticeable shrinkage experienced. Additionally, the texture of the frozen mushrooms processed according to the present invention was tender and succulent as opposed to the noticeable toughening of the conventionally frozen mushrooms.

Mushrooms prepared according to the process of example No. 11, but not blanched were frozen. Upon subsequent cooking the percentage of weight loss from the infused weight was between 40% and 50% or generally comparable to the shrinkage of fresh frozen mushrooms. However, the yield from one pound of fresh mushrooms is considerably greater when treated according to the present invention and then frozen, than if just fresh frozen as is illustrated in Table 2.

TABLE 2**

|  | START | AFTER PROCESSING | FROZEN WEIGHT | COOKED WEIGHT |
|---|---|---|---|---|
| PROCESSED BY EXAMPLE #11 | 100 | 150 | 150 | 75 to 90 |
| NORMAL COMMERCIAL PROCESSING | 100 | 110 | 110 | 50 to 60 |

**(weights expressed as percentage of fresh weight)

As can be seen in Table 2, equal batches of mushrooms were conventionally fresh frozen, and processed the same as sample No. 11, and frozen without being blanched. When later cooked, the fresh frozen mushrooms yielded a cooked weight of 50% to 60% of their fresh weight. The sample that was infused as in sample No. 11, and frozen without blanching yielded a cooked weight of 75% to 90% of their fresh weight.

Additional testing was performed to determine the effect of variations in the process in terms of particular concentrations, vacuum depth and duration under vacuum. These tests are summarized in graphic form in FIGS. 1, 2 and 3. In these tests the mushrooms were physically held below the liquid level during vacuum release to avoid possible variations due to re-entrainment of air.

In FIG. 1, the concentration of microcrystalline cellulose as AVICEL CL-611, was varied from 0.5% to 5% weight of the water vehicle used. A vacuum application of approximately 29.5 inches of mercury was used for two periods of 5 minutes each, with one minute out of vacuum between the applications. The treated mushrooms samples were blanched for 5 minutes in boiling water after the treatment, cooled, drained for 3 minutes on a slanted grid and weighed. The graph shows that there is almost a direct straight line relationship between the concentration of microcrystalline cellulose particles and the reduction in the percentage of shrinkage with all of the other factors being the same. The maximum concentration of 5% in these tests represents the concentration with this particular material where the viscosity approached a stiffness that made increasing the concentration impractical from a processing point of view.

Figure 2:
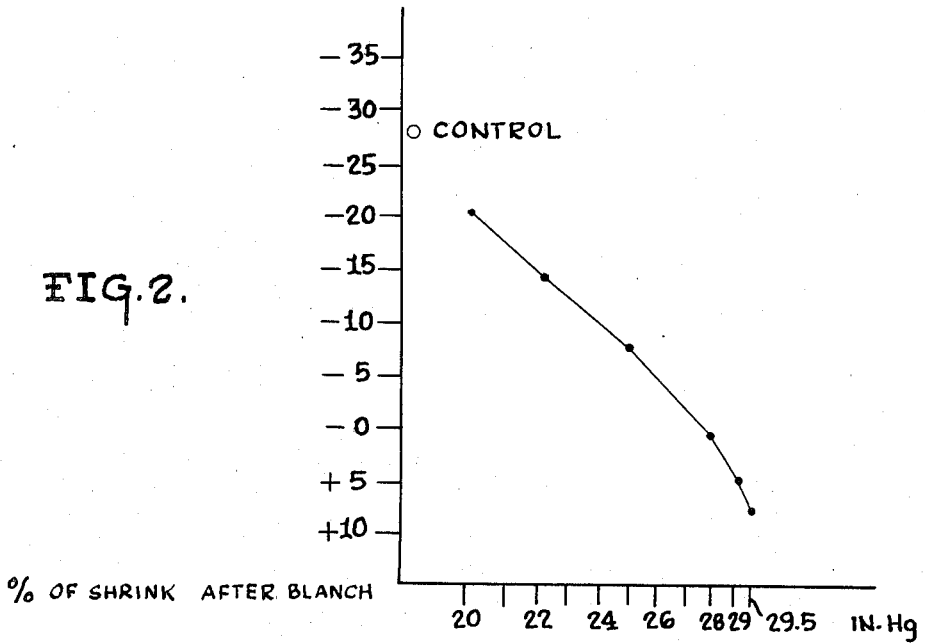

In FIG. 2, the results of a series of tests are graphically represented in which the depth of the vacuum was varied between 20 inches of mercury and approximately 29.5 inches of mercury. A 4%, by weight, suspension of AVICEL CL-611, was used in all cases and the vacuum was applied for two 5 minute periods with 1 minute period out of vacuum between the vacuum applications. The figure graphically shows that the reduction in shrinkage after blanching and cooling in this case is substantially a function of the depth of the vacuum application used and substantially correlates to the percentage of air that was not drawn out by the vacuum with the results sharply improving as a maximum vacuum level was achieved. Expressed as a ratio of the amount of air remaining in the container, a vacuum of 29.5 inches of mercury exhausts almost half of the air that still remains under a vacuum of 29 inches of mercury.

Figure 3:
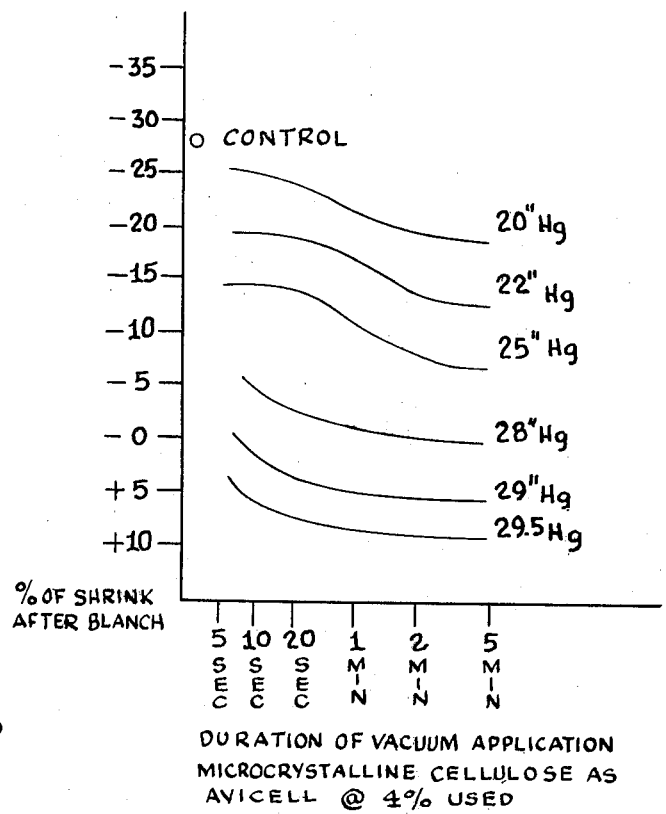

In FIG. 3, the results of a series of tests are presented graphically in which the duration of a single vacuum application was varied from time periods of 5 seconds to 5 minutes. A water base suspension of 4% by weight AVICEL CL-611 was used in all cases and the results are shown after blanching and cooling of the mushroom samples. The results are charted for a number of different vacuum levels which are individually labeled. The results show that under moderate vacuum, several minutes were required to widthdraw the maximum amount of air from within the mushroom that that particular vacuum level was capable of evacuating. Under deeper vacuum applications the air within the mushrooms is withdrawn to its particular maximum evacuation in a much more rapid time period. This is most likely due to the greater difference in relative air pressure between the interior and exterior of the mushrooms allowing the air to force its way out more rapidly toward the minimum evacuated pressure.

Under all of the vacuum levels good results were obtained after as short a duration as 5 seconds. Moderate vacuum levels required up to 5 minutes to achieve substantially the same results as in the tests shown in FIG. 2, wherein two 5 minute periods of vacuum were used in all cases. Under greater vacuum, substantially the same results were obtained in as little as 20 seconds as were achieved in the tests reported in FIG. 2. Deeper vacuum levels can be expected to achieve increased results over those shown in the graph, although a vacuum lower than that which would cause the water, or other vehicle, to freeze would be inadvisable. The vapor pressure of water at 0° C. is approximately 4.6 mm of mercury absolute, while the maximum vacuum that was used in the tests corresponds to approximately 12 mm to 13 mm of mercury absolute. Use of deeper vacuum, while it can be expected to achieve somewhat better and quicker results is neither essential nor easily practicable in commerical sized production operations.

All of the test results up to this point have dealt with mushrooms that were close to 24 hours in storage after harvest. In FIG. 4, the results of a series of tests are presented in which samples of the same lot of mushrooms were withdrawn and tested along with control samples at different time periods after harvest. The mushrooms were held after harvest under good commercial cold storage facilities specifically designed for mushrooms in which the temperature was maintained at approximately 33° F. and a high humidity level was maintained. All of the treated samples were processed using a 4% concentration of AVICEL CL-611 with two 5 minute vacuum applications and a 1 minute period between vacuum applications for uniformity.

As can be seen in FIG. 4, the amount of shrinkage experienced during processing can vary widely in the same lot of mushrooms dependent upon the length of time they have been kept after harvest prior to processing. The mushroom samples treated by the present process and those processed in a normal commercial fashion show a steady relationship of shrinkage between them regardless of the period of storage. The entire sample lot of mushrooms used in this series of tests lost weight due to continued respiration during the storage period, and the quality as judged by showing of blemishes, open veils, etc., deteriorated also. Adjustment was not made during the rest period for changes of weight of the entire sample lot during the storage period. This overall weight loss would have leveled out the resulting curves somewhat, but would not have reflected any change in the relationship between the shrinkage of the treated and control samples.

Additional testing was performed on a number of additional materials having all, or all but one of the particular physical properties of microcrystalline cellulose as AVICEL CL-611 to illustrate the particular combination of properties required for successful implementation of the process.

There are a very limited number of materials that are commercially available which are hydrophilic, non-water soluble, and have a reliably measurable particle size in the micron and submicron range.

The silicas, as silicon dioxide, are available in a wide range of uniform particle sizes from various manufactures. These fine power-like particulates are generally used in food products as anti-caking and flow improving agents in dry granular materials such as cake mixes, breading, salt and sugar. They have a high affinity for water and effectively pull moisture from the other materials such as flour to make it free flowing. These silicas were obtained from a number of manufactures in grades having uniform particle sizes ranging from 15 microns down to 0.007 microns.

FIG. 5, graphically represents the results of a series of test samples using different sizes of silica dioxide particulates. In each case the silicas were suspended in water in concentrations of 5% by weight concentrations. In cases where the particle sizes were large enough that they tended to settle out of suspension up to 0.4% of sodium carboxymethyl cellulose gum was added to the suspension in duplicate tests to maintain the suspension. Since the test results did not vary between those with and without the sodium carboxymethyl cellulose gum they are recorded on the graph at the same point indicating the silicadioxide concentration.

The tests all used two 5 minute periods of vacuum application of approximately 29.5 inches of mercury with a 1 minute period between the vacuum applications. The results are reported after blanching and cooling of the mushroom samples.

As can be seen in FIG. 5, the silicadioxide in uniform particle sizes of 2 microns diameter and larger had no effect in reducing the shrinkage of the mushroom samples. In fact, the silicadioxide which was in particle sizes too large to penetrate the mushrooms actually appeared to have drawn water from the mushrooms as these tests resulted in a greater shrinkage than the control batches which were processed in a conventional manner.

The silicadioxide suspensions containing uniform particle sizes less than 2 microns in diameter conversely had a dramatic effect in reducing the shrinkage which was almost equal to that obtained with the AVICEL CL-611.

A series of tests were also performed in which the concentration of silicadioxide particulates were varied from 0.5% to over 10%. The results of these tests for samples with particle sizes of 2 microns and larger were essentially the same as the results shown in FIG. 5. The tests using silica dioxide particles under 2 microns size showed a close relationship between the particle concentrations and the shrink similar to that illustrated in FIG. 1. Greater concentrations of these particles naturally resulted in increase in viscosity of the suspensions.

Microcrystalline cellulose is available from FMC corporation in a number of types and grades other than type CL-611. FIG. 6, shows the results of a series of tests using AVICEL type PH-105 microcrystalline cellulose. AVICEL PH-105 has an average particle size of approximately 20 microns and contains no protective hydrocolloid such as sodium carboxymethyl cellulose gum. Tests were run on this material at various concentrations in water both with and without the addition of 0.4% sodium carboxymethyl cellulose gum since the particles tend to settle out of a simple water suspension at their initial size range. Only a small reduction in the percentage of shrinkage was noted over that of the control in any concentration.

The 20 micron average particle size of this material comprises smaller particles bound together in large rod shaped or irregular bundles or clumps. The chemical bonding between the individual particles requires extremes of high shear application in order to reduce it to the smaller individual particles without chemical processing.

A laboratory size colloid mill with a 2 inch diameter flat rotor set approximately 0.5 mm from a parallel flat stator and operating at approximately 18,000 RPM was used to break down this material. A 5% suspension of AVICEL PH-105 was passed through this colloid mill a number of times and periodic sample portions of the suspension were withdrawn for microscopic inspection and testing on samples of mushrooms.

As seen from the test results graphically represented in FIG. 6, the AVICEL PG-105 suspension resulted in continually better shrinkage reducing results as the material was comminuted in the colloid mill to smaller and smaller particles which were broken up from the beginning aggregate clumps and bundles. Microscope slides were made at each stage of the milling and testing procedure and confirmed that an increasingly large portion of the visable particles were extremely small in size as the milling proceeded. After 40 passes through the mill the microscopic examination of this material appeared nearly identical to slides of AVICEL CL-611 under an optical microscope. The test results also progressively approached those experienced with AVICEL CL-611.

A number of additional materials were tested to confirm the activity in reducing shrinkage of processed mushrooms of extremely small non-water soluble particulates which are hydrophilic.

A pound of commercial dry spaghetti was placed in a Waring blender and run at high speed for 30 minutes, resulting in a fine powder.

The powder was mixed with 6 cups of cold water in the blender and run at a low speed for 1 minute. The resulting suspension was allowed to settle for 10 minutes. The vast majority of the particles settled out of the suspension leaving a cloudy supernatant water layer in the container. Approximately 5 cups of the water, containing the still suspended smallest particles, were poured off and divided into two portions. One portion was used immediately to treat a sample of mushrooms by the process using two 5 minute vacuum applications of approximately 29.5 inches of mercury with a 1 minute period out of the vacuum in between applications. The remaining settled-out particles were at the same time mixed with a further 5 cups of cold water in the blender, divided into two portions, and one portion was used to treat another sample of mushrooms.

The mushrooms treated with the supernatant liquid suspension of the smallest particles lost 11% of their weight after blanching and cooling. The mushrooms treated with the suspension of the remaining particles lost 22% of their weight after blanching and cooling. The control sample lost 27% of their weight after blanching and cooling.

The remaining portions of the supernatent liquid and the suspension of larger particles were tested again after having been stored under refrigeration for 24 hours. At this time there was no significant difference between either of these second test batches and the accompanying control sample after blanching and cooling.

Microscopic examination of the suspension immediately after initial mixing with water, revealed particles in sizes of approximately 4 microns and smaller, in irregular, sharp, mostly cubic shapes almost exclusively in the decanted liquid. The liquid containing the settled particles contained a small percentage of the smaller size particles with the majority appearing to be larger than 20 microns. The concentration of the smaller particles in the supernatent suspension was not determined accurately, but on the basis of comparison of microscopic slides, with other known materials, it is believed to be less than 1%.

Microscopic examination of the two portions after 24 hours refrigerated storage, revealed that particles in both portions had swelled, lost their sharp angular shapes, and were markedly larger in size.

Essentially identical tests using dry corn, dry rice and oriental edible rice paper were made similar to that above using spaghetti. The results of these tests parallelled closely the results of the test results using the spaghetti.

A number of additional materials that have all but one of the particular properties found to be successful in reducing shrinkage in mushrooms were tested. These materials were unsuccessful in reducing shrinkage by more than an insignificant 1% to 3% in any of the tests on a repeatable basis. The following materials are representative of these materials, most of which are either of particle sizes larger than 2 microns, or are water soluable either in cold water or immediately upon application of heat or are not hydrophilic. Starches were unsuccessfully tested as common starches, modified starches and pregelatenized starches from corn, wheat and potatoes. Xanthan gum, undenatured protein such as Pro 80, Pay Gel 90 and Pro Fam were also treated unsuccessfully as well as denatured whey powder of approximately 50 microns average size. Dry powdered Soy Lecithin as well as Soy Lecithin in an oil base was also tested unsuccessfully.

Cigarette and cigar ashes were collected and also used in a series of tests in substantially the same manner as those run on other materials tested. This ash is extremely fine in nature, easily frangible, hydrophilic, and readily disperses in water, while being non-soluable.

A 5% suspension of this ash was run in a blender at high speed for 10 minutes. After stopping the blender, floating particles which had been incompletely burned to ash were skimmed from the top. Microscopic observations of the water suspended matter, showed a wide range of particle sizes from approximately 100 microns down to apparent sub-micron particles. The mixture was allowed to stand for 2 minutes resulting in the larger particles settling out, and leaving the remaining suspended minute particles in a concentration estimated at less than 1%. This suspension was used on a test sample of mushrooms, using a standardized procedure of two 5 minute vacuum applications with a 1 minute period out of vacuum between the applications. After blanching and cooling, a shrinkage of 13% was recorded as compared to 27% for the control sample.

Microcrystalline chiten as described in U.S. Pat. No. 4,034,121 was prepared from crab shells. Tests run with this material exhibited characteristic results similar to those reported for AVICEL PH-105 with the results improving as the average particle size was reduced by passing the suspension through the small colloid mill a number of times. Due to problems in preparation of this material and limitations of the laboratory facilities available the inventors were unable to accurately determine the purity and concentration of this material as prepared. Microscopic examination of slides during the processing revealed close similarity in particle size to that experienced during similar tests with AVICEL PH-105.

It can be seen from the results of testing that a significant number of materials have the capability of reducing shrinkage in mushrooms during thermal processing. While vacuum has been shown to be a most effective method of producing an infusion of these materials into the mushrooms, pressure application followed by rapid, almost explosive release of the pressure has also been shown to be effective in producing an infusion of microscopic particulates into mushrooms. Tests were performed using pressure and rapid pressure release on the silica dioxide materials of less than 2 microns in size and the dry spaghetti supernatent suspension. These test results paralled those reported in Table 1, showing comparison of results using AVICEL CL-611 with pressure and vacuum methods.

The materials that have been shown to be effective in producing the shrinkage reduction have a number of particular properties in common despite their composition being variously plant, animal and mineral in nature. While some of these materials, such as cigarette and cigar ashes and fairly high concentrations of silicadioxide would not yield products particularly suitable for consumption as food; the results of their testing is given to illustrate the particular properties required for success in the process, and these particular materials are not especially endorsed by the inventors, for human food use, as described. These materials are all particulate in nature, and to be effective the particles must be reduced in size until the majority are less than approximately 2 microns in size and may be at least as small as 0.007 microns in size while still retaining their effectiveness in the process. The particles are not soluble in the infusion vehicle, which was water in this series of tests, and must remain undissolved under conditions of thermal processing or cooking; although in the case of the spaghetti and like materials, they may swell and soften during the cooking, without losing their effectiveness. The particles must be readily dispersible in the liquid vehicle and must have an affinity for water generally referred to as being hydrophilic.

The exact mechanism within the mushroom that causes the reduction in shrinkage when infused with the microscopic particulates is not completely understood. It may be that the intermycellular spaces are propped, much as oil wells are propped by injection of beads. It may also be that the intermycellular pores are blocked, and size loss and water loss during cooking is prevented in this manner.

A number of additional materials that have all but one of the properties of the materials found to be effective in reducing shrinkage in mushrooms were tested. These materials were unsuccessful in reducing shrinkage by more than an insignificant 1% to 2% on a repeatable basis, this shrink reduction being obtainable with water alone. The following listing is representative of these materials, starches, from corn, wheat and potatoes. These included common starches, modified starches and pregeletinized types. Protein materials in extremely fine but not submicron particles sizes in types that are not water soluable such as PRO 80, Pay Gel 90, and Pro Fam. The particle sizes of these materials range from 50 microns down to approximately 10 microns.

It is readily appreciated that the information presented by this invention can be of considerable value to the mushroom processing industry.

Mushrooms may now be processed by either a rapid vacuum, or a low order pressure infusion, to reduce weight loss substantially.

Frozen mushrooms may be processed according to this invention to reduce shrinkage and puddling upon subsequent cooking.

Both frozen and canned mushrooms may now be produced having a more desirable and tender texture than previously available.

While this invention has been described by means of a plurality of examples as to methods and materials, it is obvious that other similar materials and methods may be employed to accomplish similar results to those taught in this specification.

What we claim is:

1. A method for processing mushrooms for reducing shrinkage during subsequent cooking comprising the steps of:
   introducing the mushrooms into a sealable container whose contents include a water suspension of an effective amount of an edible microscopic sized heat stable non water soluble solid particulate hydrophilic material, with an average particle size of less than 2 microns
   subjecting the contents of the container to at least one application of a pressure whose value is sufficiently above atmospheric pressure to cause compression of the air entrained between the mycellular strands of the mushrooms tissue
   wherein, the pressure is at least 10 psi above atmospheric pressure, and the microscopic particulate material is at least 0.5% by weight of the suspension
   submerging the mushrooms in said water suspension while rapidly restoring the pressure in the container to atmospheric pressure, at a rate rapid enough to cause a portion of the compressed air entrained between the mycellular strands to be expelled from the mushrooms
   said expelled air being replaced within the mushrooms by a quantity of the water suspension, and
   removing the mushrooms from the container.

2. A method as in claim 1 further comprising the steps of:
   subjecting the contents of the container to an additional application of pressure, at least 10 psi above atmospheric pressure, and again rapidly restoring the pressure in the container to atmospheric pressure, causing additional air between the mycellular strands to be expelled and replaced by an additional portion of the suspension, prior to the removal of the mushrooms from the container.

3. A method for processing mushrooms as in claim 2; wherein,
   the concentration of the microscopic particulate hydrophilic material in the suspension is less than 10% by weight.

4. A method for processing mushrooms as in claim 3, wherein,
   the microscopic sized particulate hydrophilic material is microcrystalline cellulose.

5. A method for processing mushrooms as in claim 1; wherein,
   the rapid restoration of pressure is at a rate of at least 3 psi per second.

6. A method as in claim 1 wherein,
   the water suspension additionally includes a protective hydrocolloid to aid in suspension of the said particulate material.

7. A method as in claim 4 wherein,
   the water suspension additionally includes a protective hydrocolloid to aid in the dispersion of the microcrystalline cellulose.

8. A method for processing mushrooms with reduced shrinkage during subsequent cooking comprising the steps of:
   introducing the mushrooms into a sealable container whose contents include a water suspension of at least 0.5% by weight of an edible microscopic sized, heat stable, non water soluble, solid, particulate, hydrophilic material, with an average particle size of less than 2 microns,
   subjecting the contents of the container to a vacuum of at least 20 inches of mercury, to remove a portion of the air entrained in the intermycellular spaces of the mushrooms
   submerging the mushrooms in the water suspension while restoring the pressure in the container to atmospheric pressure causing a portion of the water suspension to replace the air removed from the intermycellular spaces, and
   removing the mushrooms from the container.

9. A method for processing mushrooms as in claim 8, further comprising the steps of:
   subjecting the contents of the container to an additional application of vacuum of at least 20 inches of mercury and again restoring the pressure to atmospheric pressure while submerging the mushrooms in the suspension, prior to removal of the mushrooms from the container.

10. A method for processing mushrooms as in claim 8, wherein,
    the concentration of the said particulate hydrophilic material in the water suspension is less than 10% by weight.

11. A method for processing mushrooms as in claim 8, wherein
    the vacuum applied is at least 28 inches of mercury.

12. A method as in claim 8 wherein,
    the said particulate is selected from the group comprising microcrystalline cellulose, microcrystalline chiten, silica dioxide, dry corn, dry rice, oriental rice paper and dry spaghetti.

13. A method as in claim 12 wherein,
    the aqueous suspension additionally contains a protective hydrocolloid to aid in dispersion of the said particulates.

14. The mushroom product produced by the process of claim 1.

* * * * *

UNITED STATES PATENT AND TRADEMARK OFFICE
CERTIFICATE OF CORRECTION

PATENT NO. : 4,407,832

DATED : October 4, 1983

INVENTOR(S) : Andrew M. Ferguson, et al

It is certified that error appears in the above-identified patent and that said Letters Patent is hereby corrected as shown below:

IN THE DRAWINGS:

In Figure 1, change the first numeral on the left side of the horizontal graph legend from (5%" to (.5%).

In Figure 4, change the first line of the legend at the top of the graph from "CL 11" to (CL 611); also change the legend at the juncture of the horizontal and vertical graph axes from "period indays" to (period in days); and, change the last word in the horizontal legend from "blank" to (blanch).

In Figure 5, change the chemical designation in the second line of the horizontal legend from "$S_1O_2$" to ($SiO_2$).

In Figure 6, change the first and third words of the legend at the juncture of the horizontal and vertical graph axes from "time" to (times), and from "solloid" to (colloid) respectively; and change the third word, of the second line, of the horizontal legend from "begining" to (beginning).

UNITED STATES PATENT AND TRADEMARK OFFICE
CERTIFICATE OF CORRECTION

PATENT NO. : 4,407,832
DATED : October 4, 1983
INVENTOR(S) : Andrew M. Ferguson, et al It is certified that error appears in the above-identified patent and that said Letters Patent is hereby corrected as shown below:

IN THE SPECIFICATION:

In column 8, line 15, change "widthdraw" to (withdraw);

In column 9, line 21, change "power-like" to (powder-like);

In column 9, lines 31, 42, 48, 51, 56, 62 and 66, change "silica dioxide" or "silicadioxide" to (silicon dioxide);

In column 10, line 34, change "PG-105" to (PH-105);

In column 12, line 8, change "chiten" to (chitin);

In column 12, line 33, change "silica dioxide" to (silicon dioxide);

In column 12, the end of line 43, and the beginning of line 44, change "silicadioxide" to (silicon dioxide).

IN THE CLAIMS:

Add the following claim:

15. The mushroom product produced by the process of claim 8.

UNITED STATES PATENT AND TRADEMARK OFFICE
CERTIFICATE OF CORRECTION

PATENT NO. : 4,407,832

DATED : October 4, 1983

INVENTOR(S) : Andrew M. Ferguson et al.

It is certified that error appears in the above-identified patent and that said Letters Patent is hereby corrected as shown below:

On the title page, "14 Claims, 6 Drawing Figures"

should read -- 15 Claims, 6 Drawing Figures --.

Signed and Sealed this

Twelfth Day of February 1985

[SEAL]

Attest:

DONALD J. QUIGG

Attesting Officer — Acting Commissioner of Patents and Trademarks

UNITED STATES PATENT AND TRADEMARK OFFICE
CERTIFICATE OF CORRECTION

PATENT NO. : 4,407,832
DATED : October 4, 1983
INVENTOR(S) : Ferguson et al.

It is certified that error appears in the above-identified patent and that said Letters Patent is hereby corrected as shown below:

Title page,
Item [63], Related U.S. Application Data, delete "Continuation-in-part of Ser. No. 266,222, May 11, 1981, abandoned, and a continuation-in-part of Ser. No. 46,078, Jun. 6, 1979, abandoned.".

Column 1,
Lines 6-10, delete the following text:
"This invention is a continuation-in-part-application of U.S. patent application Ser. No. 46,078, filed June 6, 1979, now abandoned and copending U.S. patent application Ser. No. 266,222, filed May 11, 1981 now abandoned.".

Signed and Sealed this

Sixth Day of December, 2005

JON W. DUDAS
*Director of the United States Patent and Trademark Office*

REEXAMINATION CERTIFICATE (2223rd)

United States Patent [19]

Ferguson et al.

[11] B1 4,407,832

[45] Certificate Issued Feb. 22, 1994

[54] PROCESSING OF MUSHROOMS WITH REDUCED WEIGHT LOSS

[75] Inventors: Andrew M. Ferguson, Alexandria, Va.; Howard M. Malick, West Chester, Pa.

[73] Assignee: Mushroom Associates, Kennett Square, Pa.

Reexamination Request:
No. 90/002,971, Feb. 23, 1993

Reexamination Certificate for:
Patent No.: 4,407,832
Issued: Oct. 5, 1981
Appl. No.: 308,681
Filed: Oct. 4, 1983

Certificate of Correction issued Feb. 12, 1985.

Related U.S. Application Data

[63] Continuation-in-part of Ser. No. 266,222, May 11, 1981, abandoned, and a continuation-in-part of Ser. No. 46,078, Jun. 6, 1979, abandoned.

[51] Int. Cl.$^5$ ............................................. A23L 1/212
[52] U.S. Cl. ................... 426/281; 426/615; 426/325; 426/327; 426/321
[58] Field of Search ............... 426/281, 615, 325, 327, 426/321

[56] References Cited

FOREIGN PATENT DOCUMENTS 492241 5/1981 Spain .

*Primary Examiner*—Joseph M. Golian

[57] ABSTRACT

Freshly picked washed mushrooms are subject to a modified atmosphere and infused with a suspension containing a particulate microscopic heat stable material. Upon blanching in boiling water the weight loss experienced is reduced from a normal 24% to 33% loss to between a 2% loss and a 5% or more weight gain.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-15 is confirmed.

* * * * *